Feb. 16, 1943. M. OTTO ET AL 2,311,567
PROCESS OF CARRYING OUT POLYMERIZATIONS
Filed March 8, 1938
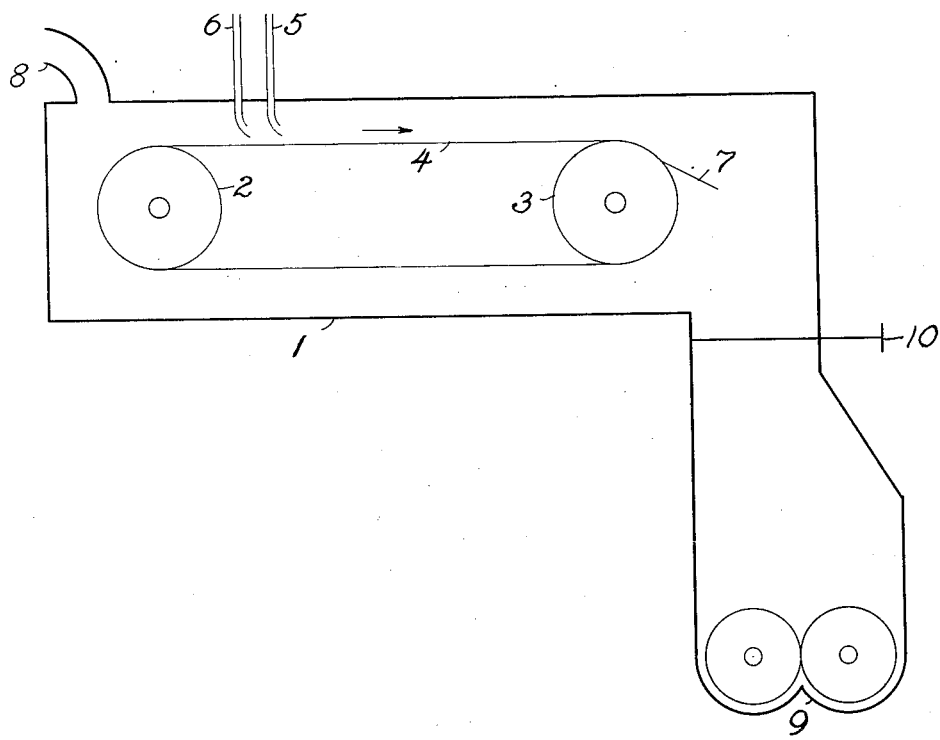
Michael Otto
Hermann Gueterbock
Alfred Hellemanns
INVENTORS
BY Hutz and Joslin
THEIR ATTORNEYS Patented Feb. 16, 1943

2,311,567

UNITED STATES PATENT OFFICE 2,311,567

PROCESS OF CARRYING OUT POLYMERIZATIONS

Michael Otto, Oppau, Hermann Gueterbock, Ludwigshafen-on-the-Rhine, and Alfred Hellemanns, Oppau, Germany, assignors, by mesne assignments, to Jasco, Incorporated, a corporation of Louisiana Application March 8, 1938, Serial No. 194,608
In Germany March 11, 1937

6 Claims. (Cl. 260—90)

The present invention relates to a process of carrying out polymerizations, more particularly in a continuous manner, and to apparatus therefor.

In the case of many polymerization processes in which semisolid to solid polymerization products are obtained, it has hitherto only been possible to carry them out discontinuously because the polymerization products formed have had to be removed periodically from the reaction vessels and this is only possible by interrupting the operation.

We have now found that the polymerization of liquid or dissolved initial materials, i. e. of material in the liquid state which is capable of polymerization and which is preferably in the monomeric state, can be carried out continuously in a simple manner by carrying out the polymerization on a moving band. The substances to be polymerized, if necessary with the addition of diluents, catalysts or the like, is supplied to one end of the band and the substance subjected to polymerization on the band. The polymerization products formed may be removed from the other end of the band. In order to prevent the liquid initial material or polymerization products of low molecular weight from flowing over the sides of the band, the latter is preferably made groove-shaped. It is preferable to use an endless band led over suitable rollers and the band may consist for example of thin, elastic steel. When gases or vapors which it is desired to recover or which cause annoyance in the surroundings are evolved during the polymerization, the band may be arranged in a gas-tight housing provided with a gas outlet pipe. The polymerization product may be withdrawn from the housing for example through a sluice-like device.

The nature of the invention will be further described with reference to the accompanying drawing which illustrates an arrangement of apparatus according to the invention but the invention is not restricted to the particular arrangement shown.

The apparatus will be described as used for the polymerization of isobutylene. Within the housing 1, which is gas-tight, there is arranged on two rollers 2 and 3 an endless steel band 4 which is made groove-shaped. One or both of the rollers 2 and 3 is or are provided with a suitable drive. The band moves in the direction of the arrow and a mixture of liquefied isobutylene and liquefied ethylene flows onto it through a pipe 5 while at the same time a solution of boron fluoride in liquefied ethylene flows onto the band through a pipe 6. As soon as the two solutions meet on the band, polymerization immediately ensues and is completed after a short time. The polymerization product formed is lifted off from the band by means of a knife-like scraper 7. It is advantageous to move the scraper 7, for example by an eccentric drive, rapidly backwards and forwards, preferably parallel to the direction in which the band 4 is moving. The gases escaping during the polymerization and consisting mainly of ethylene are withdrawn from the housing 1 through an outlet pipe 8. They may be collected in a gas-holder and used again. The polymerization product removed from the band 4 by the scraper 7 passes to a kneading device 9 capable of being heated which is also arranged in the gas-tight housing 1. The kneading device 9 mechanically works the product and frees it from enclosed gas. If it is desired to empty the kneading device, the latter is shut off from the remainder of the housing by a slide 10; the polymerization on the endless band need not be interrupted.

Instead of the kneading device, use may also be made of devices operating with a worm conveyor. In the first part of the worm conveyor the product is mechanically worked and freed from enclosed gas. At the end of the worm conveyor, the product may be pressed through suitable orifices and thus converted directly into rods of any desired cross-section or also into tubes or hose.

Other polymerization reactions may be carried out in a similar manner. In the case of reactions which require a supply of heat, a suitable heating device may be arranged around the endless band; in the same way the band may be led through a cooled zone.

The process may be used not only for the polymerization of isobutylene, but also for example for the preparation of other polymerization products of high molecular weight, as for example those of vinyl isobutyl ether. For example a solution of vinyl isobutyl ether in propane may be allowed to flow through the pipe 6 onto the band 4. In this case propane mixed with a little boron fluoride is caused to flow through the pipe 5. The polymerization takes place rapidly with the evaporation of the propane. The further working up is similar to that in the case of polymerized isobutylene.

What we claim is:

1. The process for continuously polymerizing a substance selected from the group consisting of isobutylene and vinyl isobutyl ether, which comprises continuously applying said substance in monomeric form as a freely flowing liquid to a relatively flat support, applying a solution of boron fluoride in a member of the group consisting of ethylene and propane to the liquid monomer on said support, continuously moving said support with the said materials carried thereon through a polymerizing zone thereby effecting polymerization of said monomeric substances to a from semi-solid to solid product in said zone, and continuously removing said product from said support.

2. The process for continuously polymerizing a substance selected from the group consisting of isobutylene and vinyl isobutyl ether, which comprises continuously applying said substance in monomeric form as a freely flowing liquid to a relatively flat support, immediately applying to the liquid monomer on said support a solution of boron fluoride in a member of the group consisting of ethylene and propane, continuously moving said support with the said materials carried thereon through a polymerizing zone thereby effecting the polymerization of said monomeric substances to a from semi-solid to solid product in said zone, and continuously removing said product from said support.

3. The process as defined in claim 2 wherein the substance used is isobutylene.

4. The process for continuously polymerizing a substance selected from the group consisting of isobutylene and vinyl isobutyl ether, which comprises continuously applying said substance in monomeric form as a freely flowing liquid in admixture with a member of the group consisting of ethylene and propane to a relatively flat support, applying a solution of boron fluoride in a member of the group consisting of ethylene and propane to the liquid monomer on said support, continuously moving said support with the said materials carried thereon through a polymerizing zone thereby effecting polymerization of said monomeric substances to a from semi-solid to solid product in said zone, and continuously removing said product from said support.

5. The process for continuously polymerizing a substance selected from the group consisting of isobutylene and vinyl isobutyl ether, which comprises continuously applying a film of said substance in monomeric form as a freely flowing liquid in admixture with a member of the group consisting of ethylene and propane to a relatively flat support, immediately applying to said film as formed a solution of boron fluoride in a member of the group consisting of ethylene and propane, continuously moving said support with the said materials carried thereon through a polymerizing zone thereby effecting the polymerization of said monomeric substances to a from semi-solid to solid product in said zone, and continuously removing said product from said support.

6. The process as defined in claim 5 wherein the substance used is isobutylene.

MICHAEL OTTO.
HERMANN GUETERBOCK.
ALFRED HELLEMANNS.